US012461973B2

(12) United States Patent
Takatsuka

(10) Patent No.: US 12,461,973 B2
(45) Date of Patent: Nov. 4, 2025

(54) FILE MANAGEMENT APPARATUS AND NON-TRANSITORY COMPUTER READABLE MEDIUM

(71) Applicant: FUJIFILM BUSINESS INNOVATION CORP., Tokyo (JP)

(72) Inventor: Yohei Takatsuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 615 days.

(21) Appl. No.: 17/179,704

(22) Filed: Feb. 19, 2021

(65) Prior Publication Data
US 2022/0092125 A1 Mar. 24, 2022

(30) Foreign Application Priority Data

Sep. 23, 2020 (JP) ................................ 2020-158396

(51) Int. Cl.
*G06F 16/90* (2019.01)
*G06F 16/14* (2019.01)
*G06F 16/16* (2019.01)
*G06F 16/93* (2019.01)

(52) U.S. Cl.
CPC ............ *G06F 16/93* (2019.01); *G06F 16/148* (2019.01); *G06F 16/168* (2019.01)

(58) Field of Classification Search
None
See application file for complete search history.

(56) References Cited

U.S. PATENT DOCUMENTS

| | | | |
|---|---|---|---|
| 2006/0036568 A1* | 2/2006 | Moore | G06F 16/168 |
| 2007/0146790 A1* | 6/2007 | Park | G06F 16/58 |
| | | | 358/448 |
| 2011/0055721 A1* | 3/2011 | Jain | H04N 19/46 |
| | | | 715/810 |
| 2012/0304119 A1* | 11/2012 | Hoogerwerf | G06F 16/13 |
| | | | 715/810 |
| 2016/0212118 A1* | 7/2016 | Barrall | G06F 16/211 |
| 2018/0322136 A1* | 11/2018 | Carpentier | G06F 16/188 |
| 2019/0392167 A1* | 12/2019 | Miyano | G06F 21/6227 |
| 2020/0053032 A1* | 2/2020 | Bauchot | G06F 3/04847 |
| 2021/0034571 A1* | 2/2021 | Bedadala | G06F 16/134 |

FOREIGN PATENT DOCUMENTS

| | | |
|---|---|---|
| JP | 2005-275807 A | 10/2005 |
| JP | 2006-330819 A | 12/2006 |

OTHER PUBLICATIONS

Jun. 4, 2024 Office Action issued in Japanese Patent Application No. 2020-158396.

* cited by examiner

*Primary Examiner* — Jau Shya Meng
(74) *Attorney, Agent, or Firm* — Oliff PLC

(57) ABSTRACT

A file management apparatus includes a processor configured to: perform control to display a selection screen on which a user selects plural registration location candidates for one or more electronic files, and an allocation screen that displays the plural registration location candidates selected on the selection screen, and allows the user to allocate an electronic file to each registration location candidate; and perform control to display, on the allocation screen, detailed information of each registration location candidate, which is not displayed on the selection screen.

11 Claims, 10 Drawing Sheets

FIG. 3

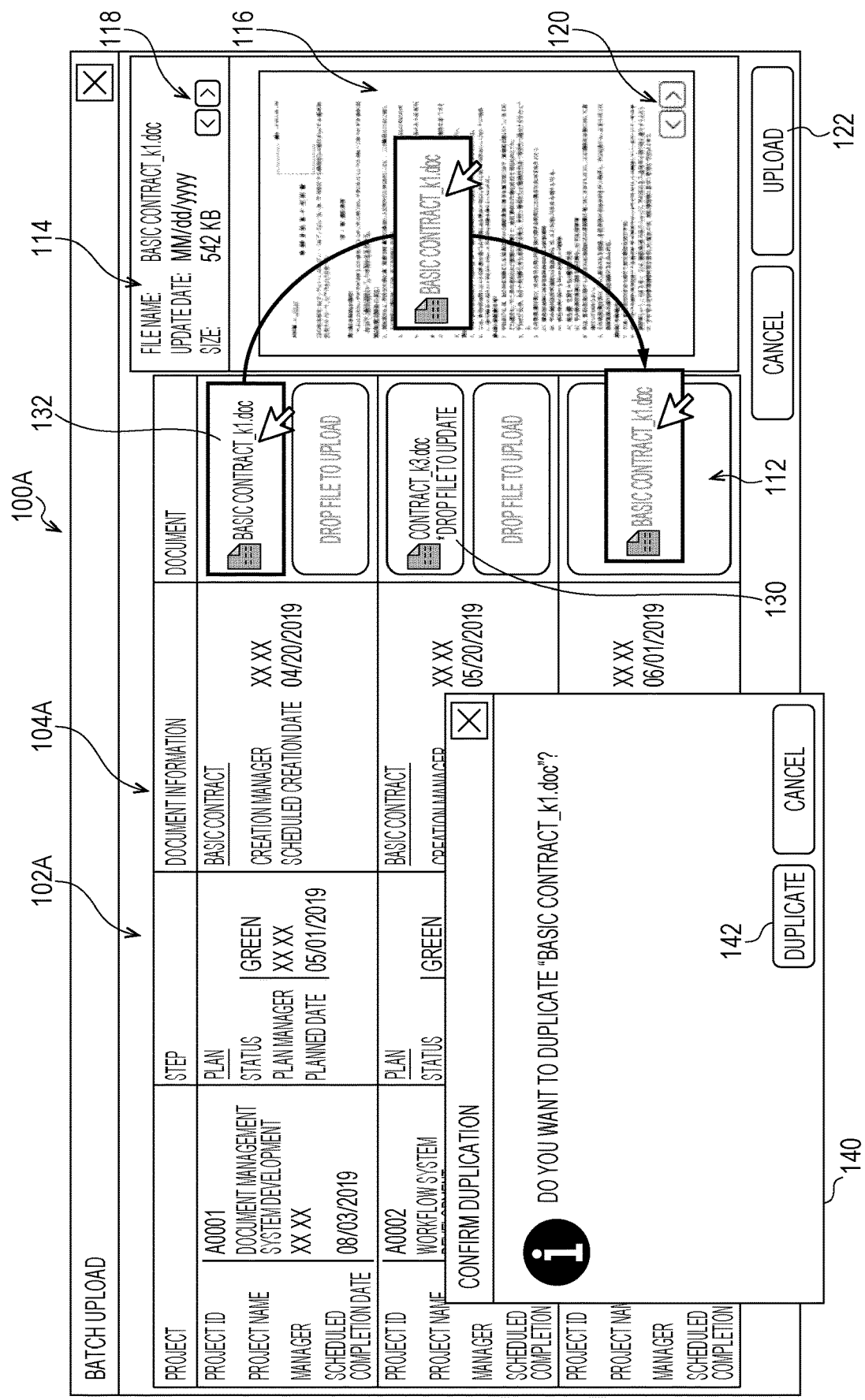

FILE MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-158396 filed Sep. 23, 2020.

BACKGROUND

(i) Technical Field

The present disclosure relates to a file management apparatus and a non-transitory computer readable medium.

(ii) Related Art

Storage (registration) of electronic files to desired folders or in a database on a server has been done by users.

Japanese Unexamined Patent Application Publication No. 2006-330819 discloses a document management apparatus that receives, from a user, specification of a to-be-copied document, specification of a plurality of folders as locations to which the to-be-copied document is copied, and an execution command, and that collectively copies the specified to-be-copied document to the specified folders.

Japanese Unexamined Patent Application Publication No. 2005-275807 discloses a document management system including a server that manages a document database, and a client connected to the server via a network. The server receives, from the client, a plurality of documents and a batch registration command, and collectively register the received documents in the document database.

In the case where a user registers the same electronic file or different electronic files to a plurality of different registration locations, the user may register an electronic file to a wrong registration location.

SUMMARY

Aspects of non-limiting embodiments of the present disclosure relate to suppressing, in the case where a user registers one or more electronic files to different registration locations, an electronic file from being registered to a wrong registration location.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a file management apparatus including a processor configured to: perform control to display a selection screen on which a user selects a plurality of registration location candidates for one or more electronic files, and an allocation screen that displays the plurality of registration location candidates selected on the selection screen, and allows the user to allocate an electronic file to each registration location candidate; and perform control to display, on the allocation screen, detailed information of each registration location candidate, which is not displayed on the selection screen.

BRIEF DESCRIPTION OF THE DRAWINGS

Exemplary embodiments of the present disclosure will be described in detail based on the following figures, wherein:

FIG. 3 is a diagram illustrating an example of a list screen;

FIG. 10 is a diagram for describing duplication of a registered document file on the allocation screen.

DETAILED DESCRIPTION

Figure 1:
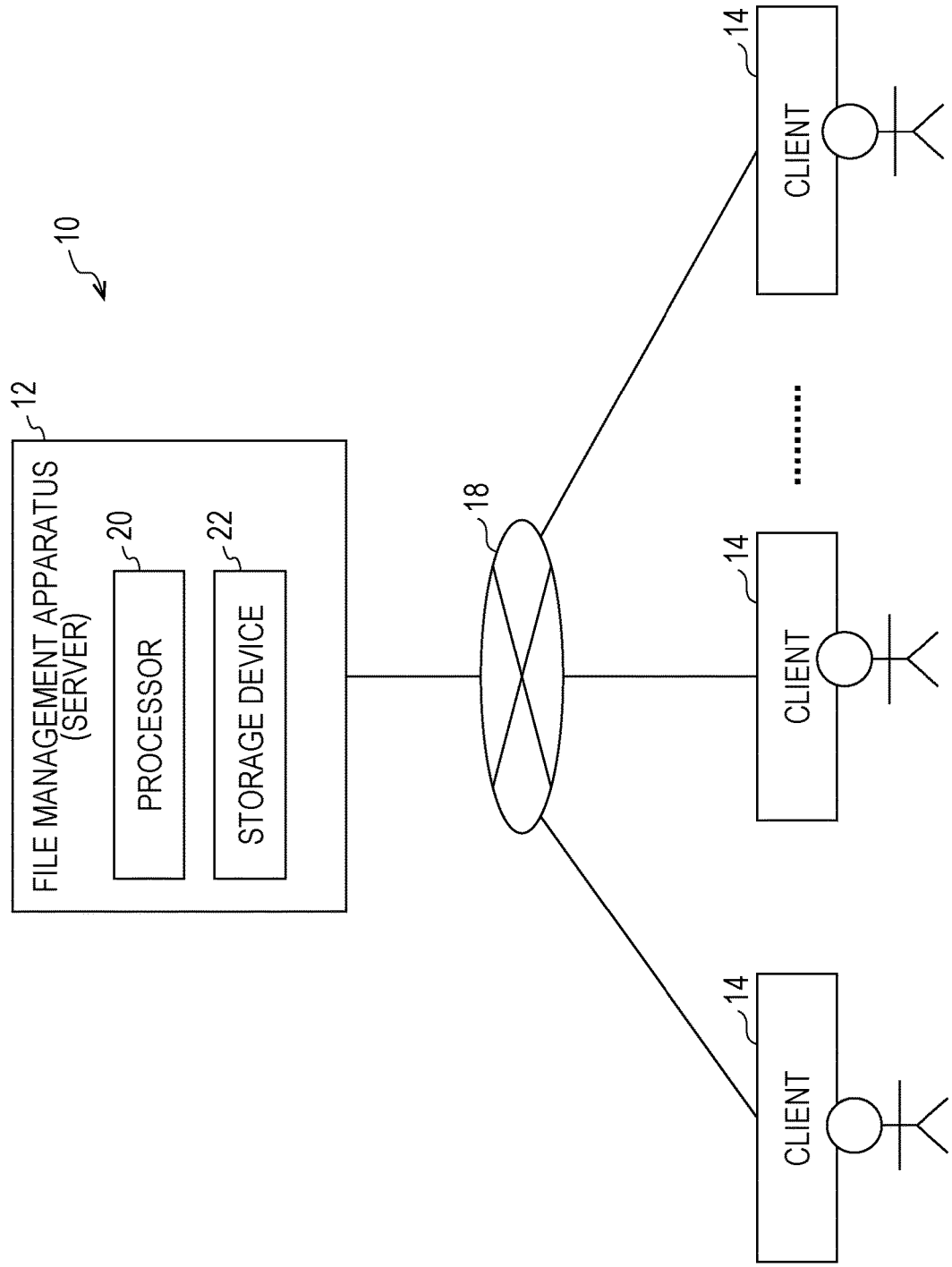
FIG. 1 is a diagram illustrating the schematic configuration of a file management system.

Hereinafter, each exemplary embodiment of the present disclosure will be described in detail with reference to the accompanying drawings. Configurations described below are examples for illustrative purposes only, and may be changed as needed according to the specifications of a system, an apparatus, or the like. In the case where a plurality of embodiments and modifications are included in the following description, it is assumed from the beginning to use their characteristic portions in appropriate combinations. The same elements are designated by the same reference numerals in all the drawings, and overlapping descriptions are omitted.

Configuration of File Management System

FIG. 1 is a diagram illustrating the schematic configuration of a file management system 10. The file management system 10 includes a server 12, which serves as a file management apparatus, and a plurality of clients 14, which are connected to the server 12 via a network 18 such as the Internet so that they may be able to communicate with each other. Hereinafter, the server 12 will be referred to as the file management apparatus 12. Note that the network 18 is not limited to the Internet, and various forms such as an intranet and a dedicated line may be adopted.

The file management apparatus 12 is a computer that manages document files in association with projects, receives registration of document files in response to requests from the clients 14, and provides registered document files to the clients 14. Although the file management apparatus 12 manages document files as electronic files in the present exemplary embodiment, electronic files managed by the file management apparatus 12 are not limited to document files. Electronic files may be in any format, and may be, for example, documents, photos, videos, and the like. The file management apparatus 12 includes a processor 20 and a storage device 22. The processor 20 includes a central processing unit (CPU), and executes information processing in accordance with a program installed in the file management apparatus 12. Note that the processor 20 may be defined as a computer in a narrow sense. The storage device 22 includes read-only memory (ROM), random-access memory (RAM), flash memory, a hard disk drive, and the like, and stores a program executed by the processor 20 and a document database (see FIG. 2). The file management apparatus 12 functions as a web server.

Note that a program executed by the processor 20 of the file management apparatus 12 may be provided not only via a network such as the Internet, but also by being stored in a computer-readable recording medium such as an optical disc or universal serial bus (USB) memory.

Each client 14 is a personal computer (PC), a tablet terminal, a smartphone, or the like operated by a user. A web browser for displaying screen information sent from the file management apparatus 12 is installed in the client 14. The user activates the web browser, moves to a web page provided by the file management apparatus 12, and performs a log-in operation on the web page, thereby allowing a list screen (see FIG. 3) and a registration screen (see FIGS. 6 and 9) provided by the file management apparatus 12 to be displayed on the display of the client 14, and the user performs operations on these screens. Instead of the web browser, a dedicated application may be used on the client 14.

Functional Configuration of File Management Apparatus

Figure 2:
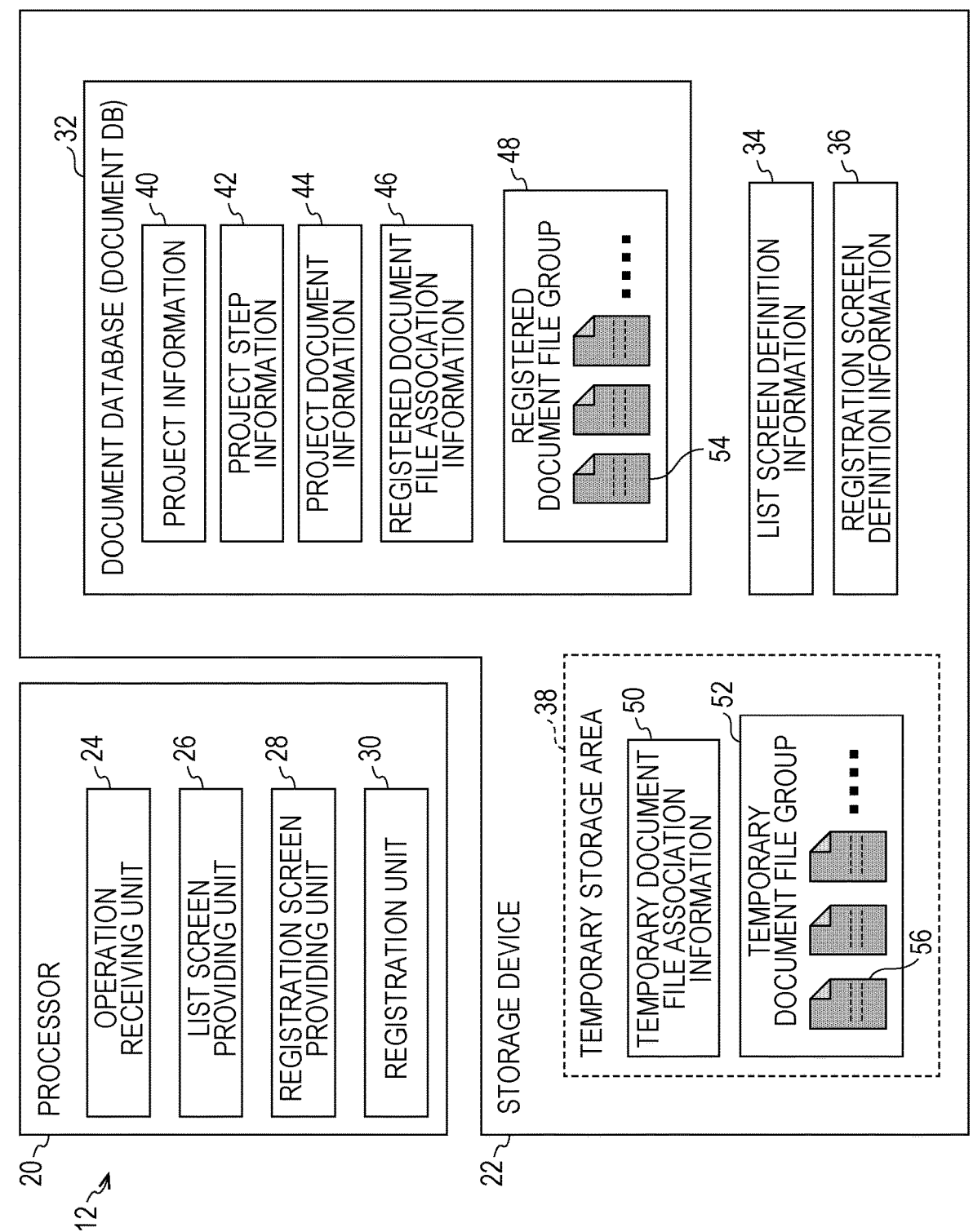
FIG. 2 is a functional block diagram of a file management apparatus.

FIG. 2 is a functional block diagram of the file management apparatus 12. The processor 20 operates in accordance with a program (not illustrated) stored in the storage device 22, thereby functioning as an operation receiving unit 24, a list screen providing unit 26, a registration screen providing unit 28, and a registration unit 30. The operation receiving unit 24 receives an operation from the client 14. The list screen providing unit 26 provides a list screen to the client 14. The registration screen providing unit 28 provides a registration screen to the client 14. The registration unit 30 registers a document file received from the client 14 in a document database 32.

The document database 32 (hereinafter referred to as the document DB 32), which manages document files in association with projects, is stored in the storage device 22 of the file management apparatus 12. The document DB 32 includes project information 40, project step information 42, project document information 44, registered document file association information 46, and a registered document file group 48.

Figure 3:
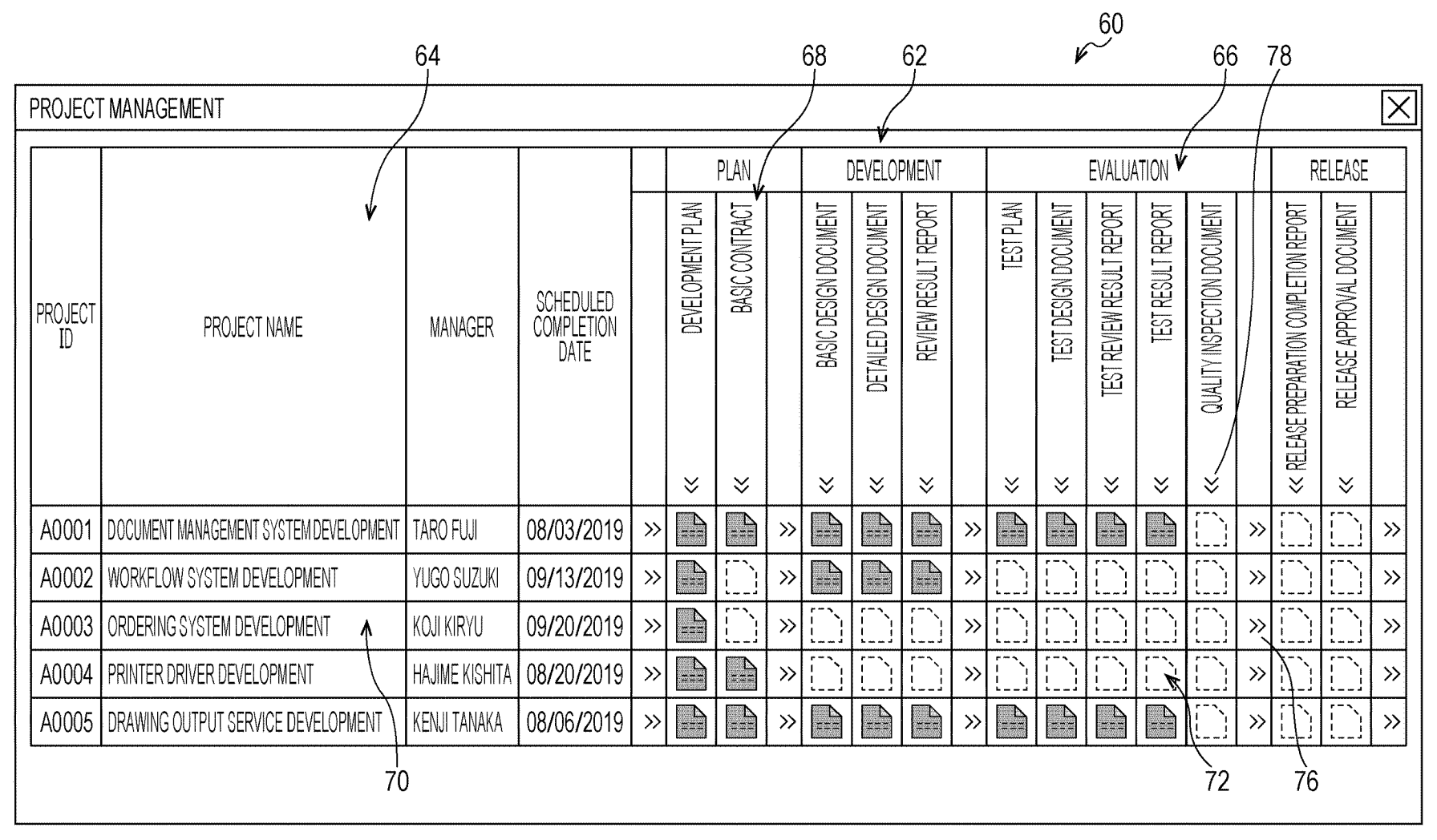

Here, a project is a work (including a task) that includes a plurality of steps, and exemplary projects include "document management system development", "workflow system development", and "ordering system development" on a list screen 60 illustrated in FIG. 3. A project step (hereinafter may also be referred to as a step) is a step performed when executing a project, and exemplary steps include "plan", "development", and "evaluation" on the list screen 60 illustrated in FIG. 3. A project document is the type of document file (hereinafter referred to as a document type) scheduled to be created in each step when executing a project, and exemplary documents include "development plan", "basic contract", and "basic design document" on the list screen 60 illustrated in FIG. 3.

For each project, there is the project information 40 in the document DB 32. For example, the project information 40 associates information regarding a project, such as "A0001" (project identification (ID)), "document management system development" (project name), and "Taro Fuji" (manager) on the list screen 60 illustrated in FIG. 3.

For each step of each project, there is the project step information 42 in the document DB 32. For example, the project step information 42 associates information regarding a step, such as "Shinjiro Tanaka" (technical manager), "Tetsuo Mikami" (administrative manager), "Jun. 20, 2019" (scheduled evaluation start date), and "Jul. 20, 2019" (scheduled evaluation completion date) in the step "evaluation" indicated in the item "step" on a registration screen 100 illustrated in FIG. 6.

For each document type which is scheduled to be created in each step of each project, there is the project document information 44 in the document DB 32. For example, the project document information 44 associates information regarding a document, such as "Shinjiro Tanaka" (creation manager) and "Jun. 10, 2019" (scheduled creation date) in "test plan" indicated in the item "document information" on the registration screen 100 illustrated in FIG. 6.

The project information 40, the project step information 42, and the project document information 44 in the document DB 32 are generally information registered by the user through the client 14 at, for example, the review stage of the schedule of each project before document files are registered to the document DB 32.

The registered document file group 48 in the document DB 32 is a group of document files that are registered and stored in the document DB 32 in response to commands from the client 14. The registered document file association information 46 in the document DB 32 is information indicating to which document of which project each document file of the registered document file group 48 corresponds.

Overview of List Screen

Next, the overview of the list screen and the registration screen will be described. FIG. 3 is a diagram illustrating an example of the list screen 60. The list screen 60 is a screen indicating the registration situation of each document file in the document DB 32. In addition, the list screen 60 is also a document file registration location selecting screen for registering a document file to the document DB 32 or reading a registered document file from the document DB 32.

Definition of Registration Location, Etc.

Here, a registration location means at least one of a location to which a document file is stored and a location to which a document file is positioned, and in the present exemplary embodiment, a registration location is a location to which a document file identified by the identification information (such as the project name) of a project and the document type is positioned. "Registering a document file to a registration location" means at least one of the following: storing a document file to a storage location as a registration location; and associating a document file with a positioning location as a registration location. In the present exemplary embodiment, registering a document file to a registration location is associating a document file with the identification information of a project and the document type in the document DB 32. In addition, a registration location candidate is, among registration locations, a candidate for a registration location when registering a document file. The list screen 60 is one example of a selection screen on which a user selects a plurality of registration location candidates for one or more document files using a batch selection part 76 in units of steps or a batch selection part 78 in units of documents, which will be described later.

Overview of Registration Screen

Figure 4:
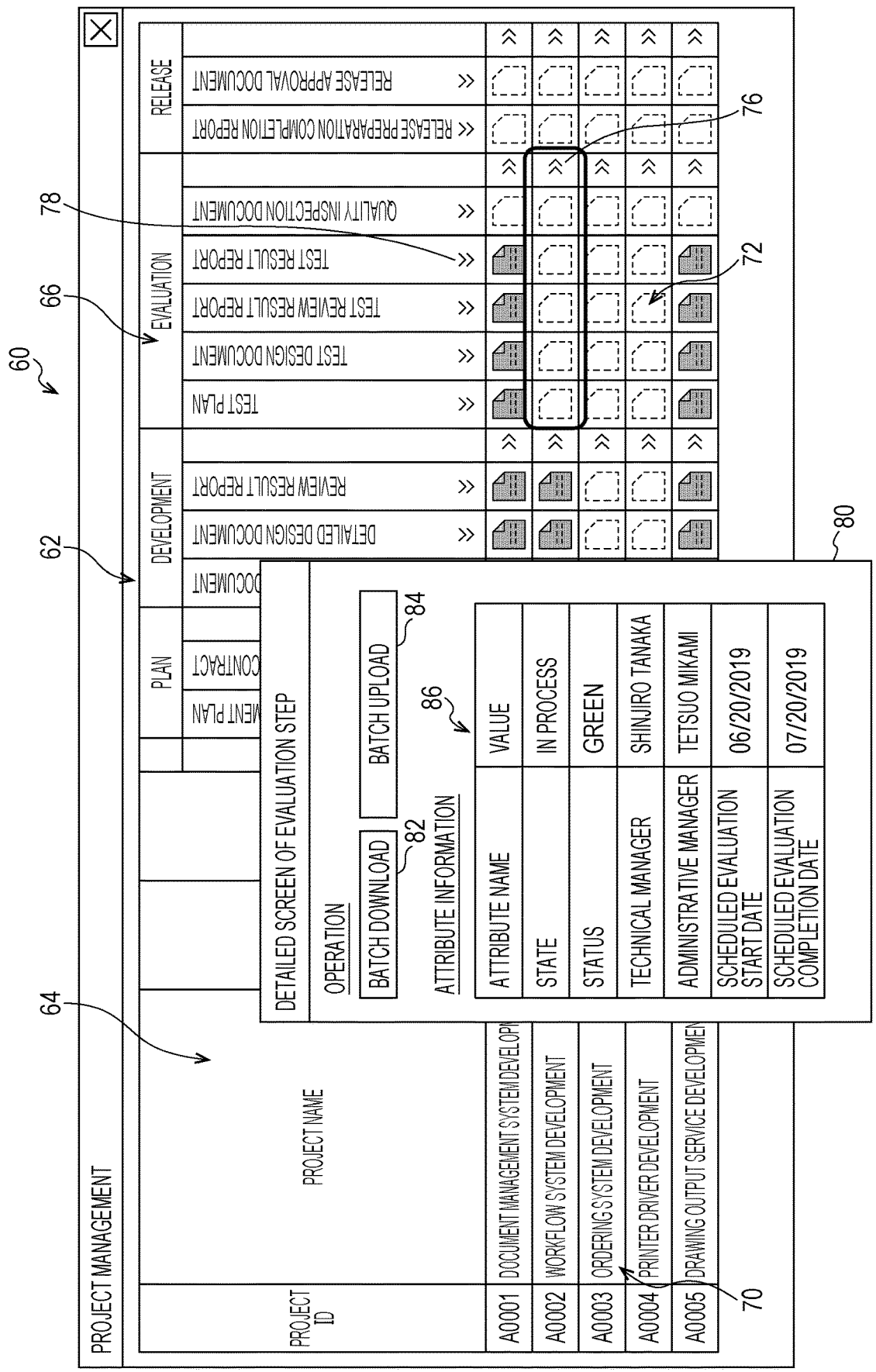
FIG. 4 is a diagram for describing batch selection based on the same step.
Figure 6:
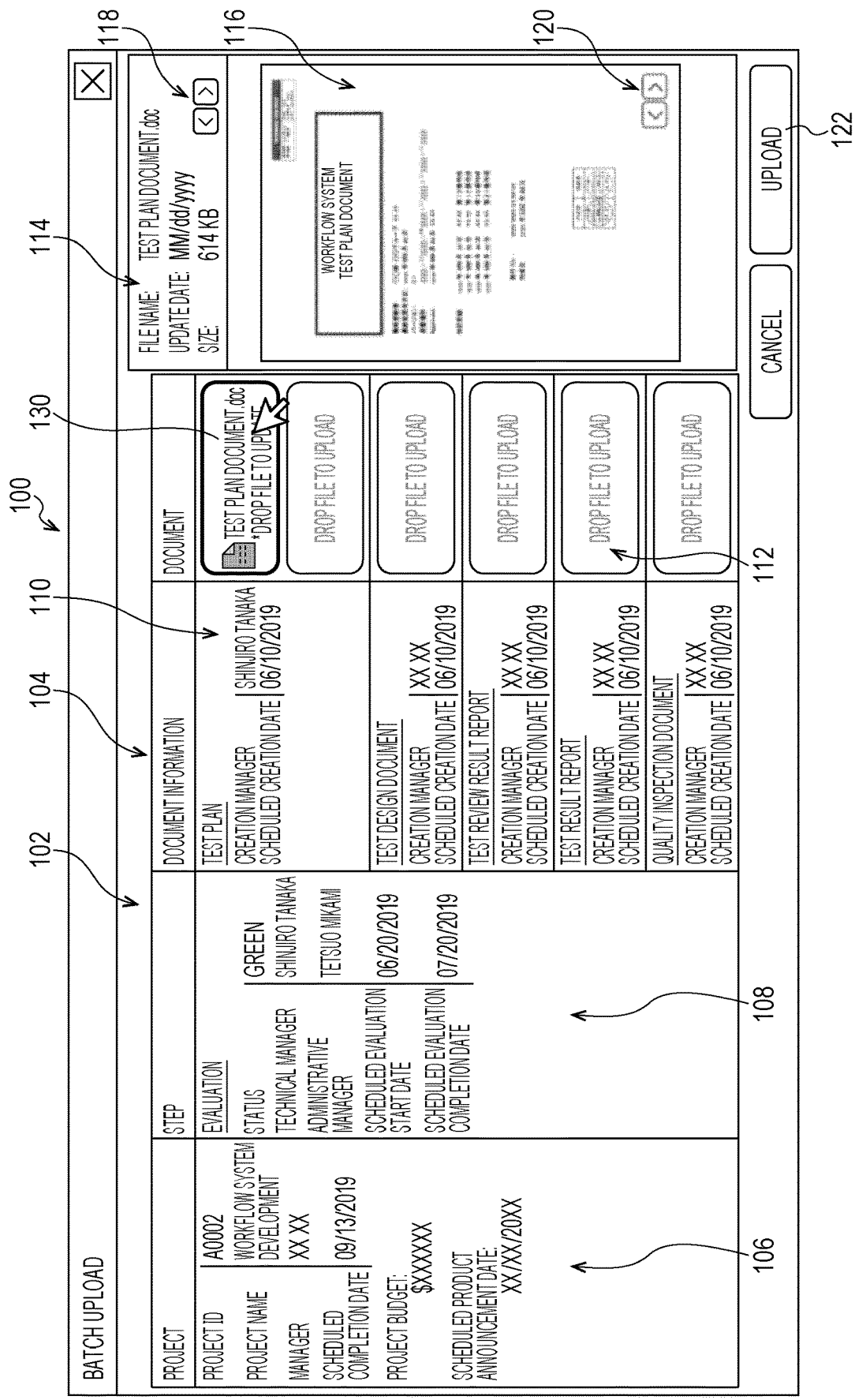
FIG. 6 is a diagram illustrating an example of a registration screen for batch selection based on the same step.
Figure 7:
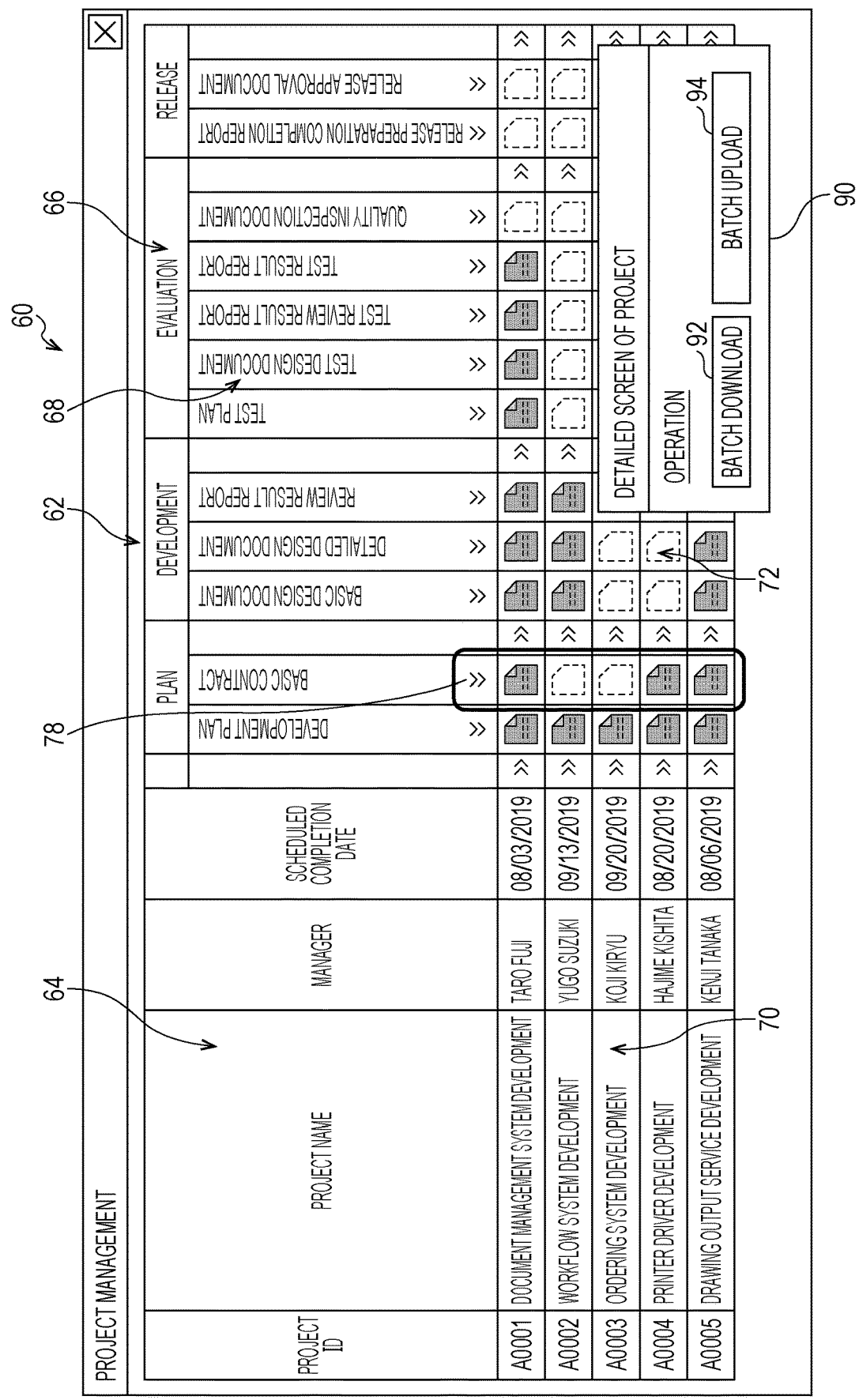
FIG. 7 is a diagram for describing batch selection based on the same document.
Figure 9:
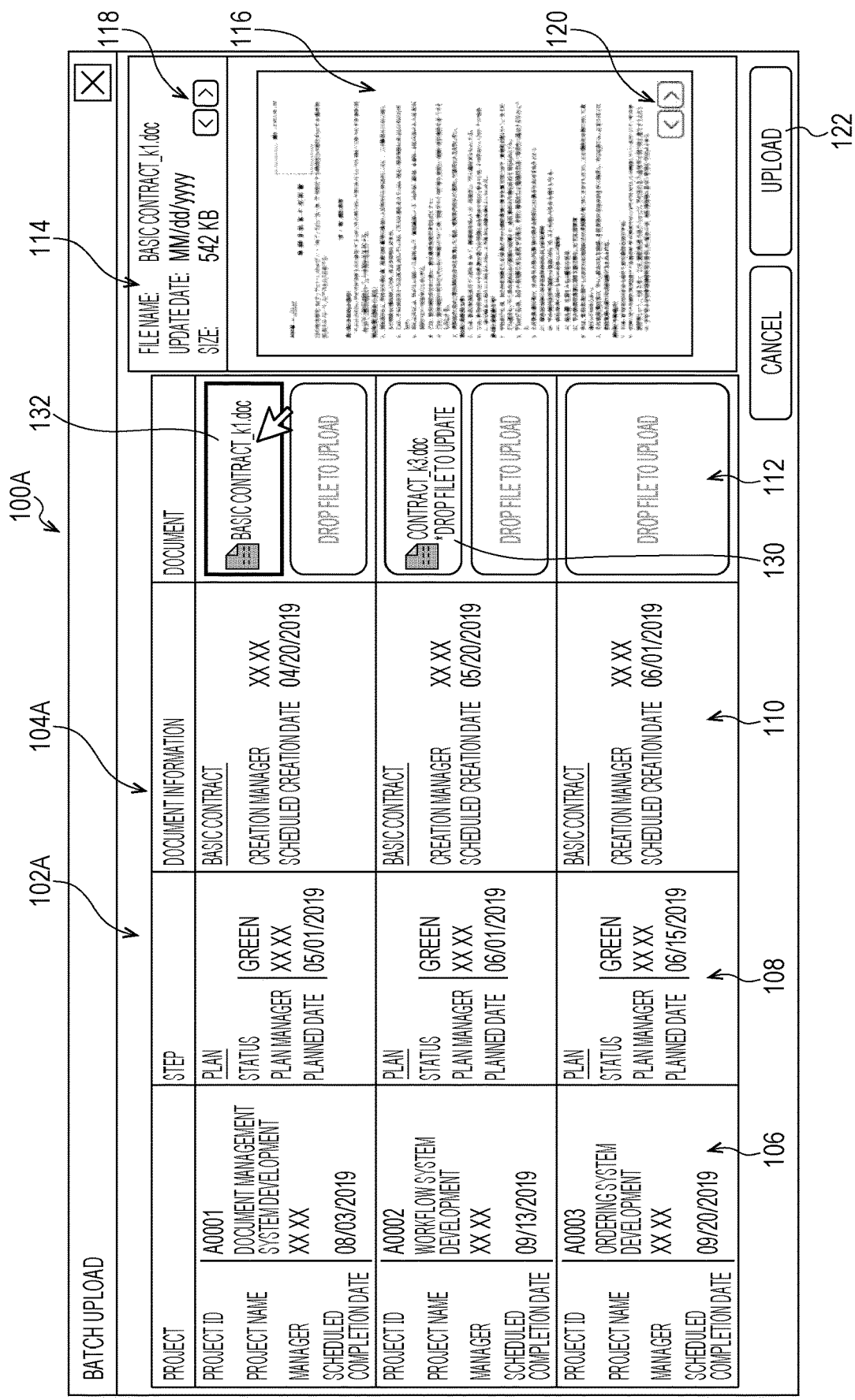
FIG. 9 is a diagram illustrating an example of a registration screen for batch selection based on the same document.

The registration screen has two forms, and examples of these two forms are illustrated in FIGS. 6 and 9, respectively. The registration screen 100 illustrated in FIG. 6 is a screen displayed in response to batch selection of a plurality of registration location candidates in units of steps of a project by pressing the batch selection part 76 in units of steps, as illustrated in FIG. 4, on the list screen 60, and outputting of a batch registration (batch uploading) request. A registration screen 100A illustrated in FIG. 9 is a screen displayed in response to batch selection of a plurality of registration location candidates in units of document types by pressing the batch selection part 78 in units of documents, as illustrated in FIG. 7, on the list screen 60, and outputting of a batch registration (batch uploading) request.

The registration screen 100 (see FIG. 6) includes an allocation screen 102, which includes an allocation table 104, a file information display section 114, and a preview display section 116. In the allocation table 104, a document file is allocated by the user to each of a plurality of registration location candidates (an allocation field 112 in FIG. 6). By pressing an upload button 122 after the user allocates document files to the individual registration location candidates, these document files are registered to the respective registration location candidates. At the stage at which the document files are allocated, the document files may be temporarily registered to the respective registration location candidates, and thereafter, under certain conditions (such as reception of button pressing or elapse of a certain time), the document files may be fully registered (that is, enter a registered state). A great feature of the present exemplary embodiment resides in the point that detailed information of each registration location candidate (such as the creation manager and the scheduled creation date of each document in the item "document information" illustrated in FIG. 6), which is not displayed on the list screen 60, is displayed on the allocation screen 102. Detailed information of each registration location candidate is information that represents the attribute of the registration location candidate and is information not displayed on a selection screen. In other words, detailed information of each registration location candidate is information that may not be grasped from a selection screen. Accordingly, the user may be suppressed from allocating and registering a document file to a wrong registration location candidate.

Details of List Screen

Next, the list screen 60 will be described in detail. As illustrated in FIG. 3, the list screen 60 includes a list table 62. The list table 62 includes a project item 64, a step item 66, a document item 68, a project information field 70, and an element field 72. In the project information field 70, items of information regarding a project are arranged horizontally, and projects are arranged vertically. In the step item 66, the names of steps of a project are arranged horizontally. In the document item 68, the names of documents created in steps of a project are displayed in association with the steps.

The list table 62 is a table with projects arranged vertically to serve as vertical items, and documents created in each project that are arranged horizontally to serve as horizontal items. In each element of the element field 72 of the list table 62, whether a document file corresponding to a project and to a document is registered is displayed. In each element of the element field 72, a mark indicating a file (referred to as a file mark) is displayed in the case where a document file is registered, and the dashed contour of a file mark is displayed in the case where no document file is registered.

The format, the project item 64, the step item 66, and the document item 68 of the list table 62 are defined in list screen definition information 34 (see FIG. 2) stored in the storage device 22. The processor 20 of the file management apparatus 12 functions as the list screen providing unit 26, and, using the list screen definition information 34, and the project information 40 and the registered document file association information 46 in the document DB 32, generates and presents the list table 62 to the display of the client 14.

The list screen providing unit 26 displays, out of the project information 40 in the document DB 32, information corresponding to the project item 64 of the list table 62, which is defined in the list screen definition information 34, in the project information field 70. In addition, the list screen providing unit 26 displays the element field 72 of the list table 62 using the registered document file association information 46 in the document DB 32. Specifically, the list screen providing unit 26 generates the element field 72 of the list table 62 by regarding a document of a project (registration location) which is not associated with a document file in the registered document file association information 46 in the document DB 32 as unregistered, and a document of a project (registration location) which is associated with a document file as registered, and displays the list table 62 with the element field 72.

The list table 62 includes the batch selection part 76 in units of steps, which is for collectively selecting a plurality of documents in units of steps of a project, and the batch selection part 78 in units of documents, which is for collectively selecting a plurality of documents in units of documents of the same type. The batch selection part 76 in units of steps is a button with a mark having two greater-than signs overlapped, and is provided for each step of each project. The batch selection part 78 in units of documents is a button with a mark having two greater-than signs overlapped and rotated by 90 degrees, and is provided in units of documents. Hereinafter, processing in the case where the batch selection part 76 in units of steps is pressed will be described first, and then processing in the case where the batch selection part 78 in units of documents is pressed will be described.

Batch Selection in Units of Steps

The processor 20 of the file management apparatus 12 functions as the operation receiving unit 24, and receives an operation from the client 14. By pressing the batch selection part 76 in units of steps on the list table 62 with a mouse cursor or the like, the user collectively selects a plurality of documents corresponding to the pressed batch selection part 76 in units of steps, as surrounded and indicated by a rounded rectangle illustrated in FIG. 4. In response to the user's pressing of the batch selection part 76 in units of steps, the list screen providing unit 26 displays a pop-up window 80, as illustrated in FIG. 4.

The pop-up window 80 includes a batch download (batch reading) button 82 and a batch upload (batch registration) button 84. By pressing the batch download button 82 with a mouse cursor or the like, the user allows, among the documents selected by the batch selection part 76 in units of steps on the list table 62, one or more registered document files (one or more registered document files in the document DB 32) to be read to the client 14.

In contrast, by pressing the batch upload button 84 on the pop-up window 80 with a mouse cursor or the like, the user allows the registration screen 100 as illustrated in FIG. 6 to be displayed on the display of the client 14. Hereinafter, the registration screen 100 illustrated in FIG. 6 will also be referred to as a registration screen corresponding to batch selection in units of steps.

Note that the pop-up window 80 includes a step information table 86. The step information table 86 is a table representing information regarding a step of a project (hereinafter referred to as a selected step) selected by the batch selection part 76 in units of steps on the list table 62. In the step information table 86 illustrated in FIG. 4, "technical manager", "administrative manager", "scheduled evaluation start date", and "scheduled evaluation completion date" are represented as information regarding the evaluation step of the project A0002 (project ID). These items of information are those that have been read by the list screen providing unit 26 from the project step information 42 in the document DB 32 and displayed.

Note that the item "state" in the step information table 86 indicates whether the selected process is being executed. For example, when the current date is within the range from the scheduled evaluation start date to the scheduled evaluation completion date in information of the selected step, it is displayed that the selected step is being executed; otherwise, it is displayed that the selected step is not being executed. In addition, the item "status" in the step information table 86 is indicated green when the selected step proceeds as scheduled; otherwise, it is indicated red. For example, if the current date is past the scheduled evaluation completion date in information of the selected step, and, among a plurality of documents belonging to the selected step, there is a document file that is not registered to the document DB 32, the status is displayed "red"; otherwise, the status is displayed "green".

Registration Screen Corresponding to Batch Selection in Units of Steps

Next, a registration screen corresponding to batch selection in units of steps will be described in detail. As illustrated in FIG. 6, the registration screen 100 includes the allocation screen 102, which includes the allocation table 104, the file information display section 114, and the preview display section 116. The allocation table 104 includes a project information field 106, a step information field 108, a document information field 110, and the allocation field 112. The format and the items of the allocation table 104 are defined in registration screen definition information 36 (see FIG. 2) stored in the storage device 22.

Figure 5:
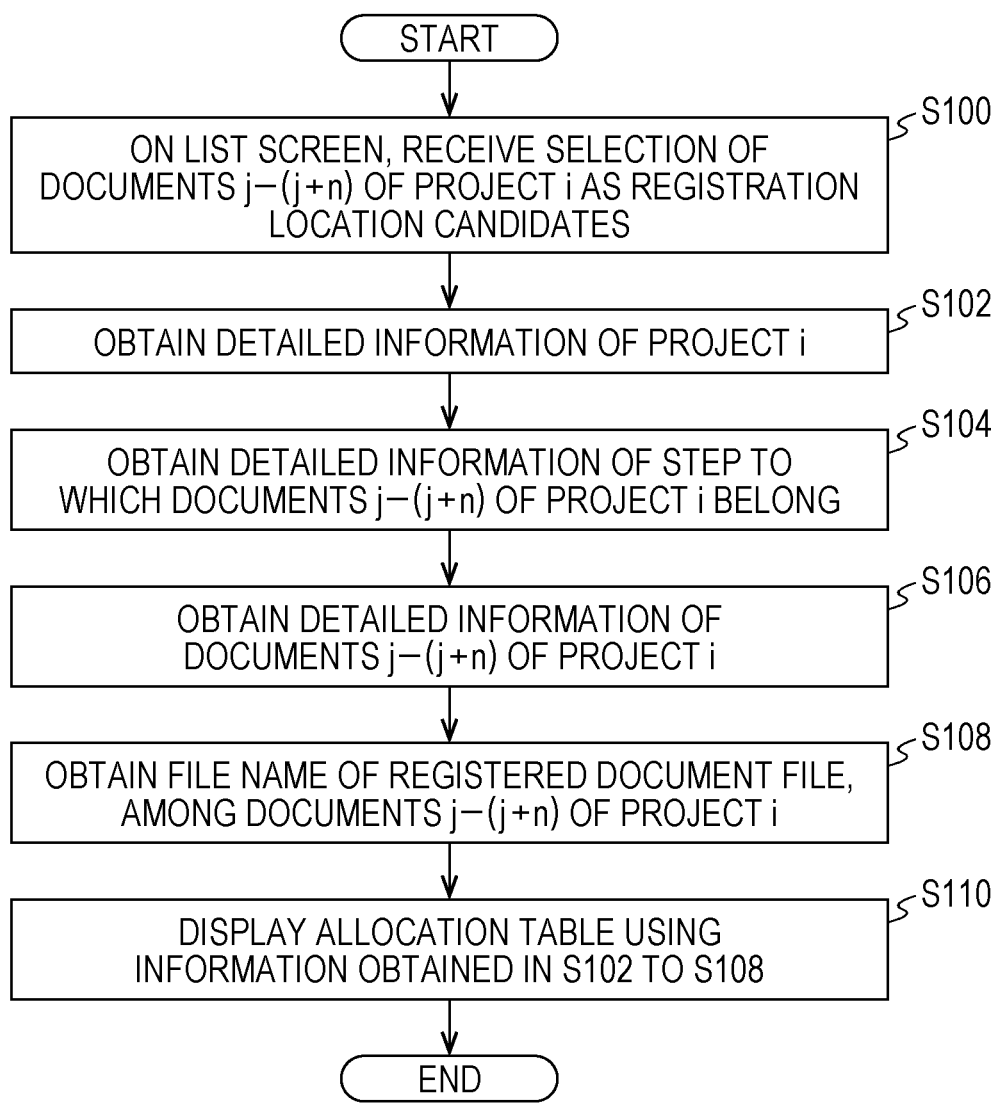
FIG. 5 is a flowchart illustrating the flow of a process of displaying an allocation screen for batch selection based on the same step.

Here, the operation of the processor 20 of the file management apparatus 12 for displaying the allocation table 104 will be described. FIG. 5 is a flowchart illustrating the flow of a process performed by the processor 20 of the file management apparatus 12 to display the allocation table 104.

In step S100 in FIG. 5, the processor 20 functions as the operation receiving unit 24, and receives selection of documents j- (j+n) of a project i as registration location candidates on the list table 62 (see FIG. 4). This is processing in the case where, in FIG. 4, the batch selection part 76 in units of steps is pressed, and the batch upload button 84 is pressed on the pop-up window 80. Here, the project i refers to the i-th project when projects indicated in the project information field 70 of the list table 62 (see FIG. 3) are sequentially numbered from the top; the document j refers to the j-th document when documents indicated in the document item 68 of the list table 62 are sequentially numbered from the left; and the documents j- (j+n) refer to n documents (registration location candidates).

Next, in step S102, the processor 20 functions as the registration screen providing unit 28, and obtains detailed information of the project i from the project information 40 in the document DB 32. The obtained detailed information is displayed in the project information field 106 of the allocation table 104 (see FIG. 6). Note that the flow illustrated in FIG. 5 is a mode in which, after obtaining information in each of steps S102 to S108, in step S110, the registration screen providing unit 28 generates the allocation table 104 using the obtained items of information and displays the allocation table 104.

Next, in step S104, the registration screen providing unit 28 obtains detailed information of a step to which the documents j- (j+n) of the project i belong from the project step information 42 in the document DB 32. The obtained detailed information is displayed in the step information field 108 of the allocation table 104.

Next, in step S106, the registration screen providing unit 28 obtains detailed information of each of the documents j- (j+n) of the project i from the project document information 44 in the document DB 32. The obtained detailed information is displayed in the document information field 110 of the allocation table 104. As illustrated in FIG. 6, items of detailed information of the documents are vertically arranged and displayed in the document information field 110.

Next, in step S108, the registration screen providing unit 28 obtains the file name of a document file registered to the document DB 32, among the documents j- (j+n) of the project i, from the registered document file association information 46 in the document DB 32. The obtained file name is displayed in the allocation field 112 of the allocation table 104. In the allocation field 112, the file name of a registered document file is displayed in association with each document in the document information field 110. In the allocation table 104 illustrated in FIG. 6, an example of displaying the file name of a registered document file in the allocation field 112 is not illustrated, but an example of displaying the file name of an allocated document file (described later) in the allocation field 112 is illustrated. An allocated document file is a document file that is not in a registered state. An example of displaying the file name of a registered document file in the allocation field 112 is illustrated in an allocation table 104A illustrated in FIG. 9, and it is "basic contract_k1.doc" in FIG. 9. As illustrated in FIG. 9, in order to differentiate a registered document file (basic contract_k1.doc) and an allocated document file (contract_k3.doc), these file names are surrounded by rectangles with different forms. Specifically, a file name surrounded by a rectangle with right-angled corners is the file name of a registered document file, and a file name surrounded by a rectangle with round corners is the file name of an allocated document file.

Next, in step S110 in FIG. 5, the registration screen providing unit 28 generates the allocation table 104 using the registration screen definition information 36 (see FIG. 2) and the items of information obtained in steps S102 to S108, and presents the allocation table 104 to the display of the client 14. So far is the description of the flow illustrated in FIG. 5.

In the allocation table 104 illustrated in FIG. 6, the user allocates a document file stored in the client 14 to the allocation field 112 of a document (registration location candidate) where the user desires to register the document file by, for example, drag-and-drop. The document file allocated to the allocation field 112 is an allocated document file, and the file name of the allocated document file is displayed in the allocation field 112. It is "test plan.doc" in FIG. 6.

Here, detailed information of a document (registration location candidate) that is not displayed on the list screen 60 is displayed on the allocation screen 102. In FIG. 6, "project budget" and "scheduled product announcement date" in the project information field 106, "technical manager", "administrative manager", "scheduled evaluation start date", and "scheduled evaluation completion date" in the step information field 108, and "creation manager" and "scheduled creation date" of each document in the document information field 110 are detailed information. Note that, although each project's detailed information, such as the project's "manager" and "scheduled completion date", is displayed on the list screen 60 illustrated in FIG. 3, if the element field 72 on the list screen 60 is to be displayed widely, such detailed information will not be displayed on the list screen 60, but will be displayed only on the allocation screen 102.

While checking the detailed information of each registration location candidate displayed in the allocation table 104, the user is able to allocate a document file to the allocation field 112 of each registration location candidate in the allocation table 104. Accordingly, allocation of a document file to a wrong registration location candidate is suppressed.

When the user allocates a document file to the allocation field 112 in association with each document (each registration location candidate) in the document information field 110 of the allocation table 104, each of these document files is stored as a temporary document file in a temporary storage area 38 (see FIG. 2) of the storage device 22 of the file management apparatus 12. A temporary document file group 52 in the storage device 22 illustrated in FIG. 2 represents a group of temporary document files 56. In response to storage of each temporary document file 56 to the temporary storage area 38, temporary document file association information 50, which indicates to which document of which project the temporary document file 56 corresponds, is generated and is stored in the temporary storage area 38.

After that, when the user presses the upload button 122 on the registration screen 100 illustrated in FIG. 6 with a mouse cursor or the like, each document file allocated to the allocation field 112 is registered to the document DB 32. This is realized as follows. The processor 20 of the file management apparatus 12 functions as the registration unit 30, moves a temporary document file stored in the temporary storage area 38 to the document DB 32 to be part of the registered document file group 48, and moves the temporary document file association information 50 stored in the temporary storage area 38 to the document DB 32 to be part of the registered document file association information 46.

As described above, the registration screen 100 includes the file information display section 114 and the preview display section 116, besides the allocation screen 102. The file information display section 114 is a section that displays, when the user presses an allocated document file or a registered document file, which is arranged in the allocation field 112 of the allocation table 104, with a mouse cursor or the like, attribute information of the pressed document file (hereinafter referred to as a selected document file). Here, attribute information of an electronic file is information that represents the attribute of the electronic file, and includes, for example, the update date and time, updater, size, creation date and time, and creator of the electronic file. In the case of a document file, the number of pages and the number of words may be attribute information. In the case of a video file, the length may be attribute information.

The preview display section 116 is a section that displays, when the user presses an allocated document file or a registered document file, which is arranged in the allocation field 112 of the allocation table 104, with a mouse cursor or the like, a preview screen of the selected document file.

In the case where the selected document file is an allocated document file, the registration screen providing unit 28 reads the attribute information and the file body (or thumbnail) of a temporary document file which is the selected document file, which is in the temporary storage area 38 of the storage device 22. The registration screen providing unit 28 displays the read attribute information in the file information display section 114, and, on the basis of the read file body (or thumbnail), displays a preview screen in the preview display section 116. Accordingly, by pressing an allocated document file with a mouse cursor or the like on the registration screen 100, the user is able to check the attribute information and the preview screen of the document file. Allocation and registration of a wrong document file to a registration location candidate is suppressed.

In addition, in the case where the selected document file is a registered document file, the registration screen providing unit 28 reads the attribute information and the file body (or thumbnail) of a document file which is the selected document file, which is in the document DB 32. The registration screen providing unit 28 displays the read attribute information in the file information display section 114, and, on the basis of the read file body (or thumbnail), displays a preview screen in the preview display section 116. Accordingly, the user is able to check the details of the registered document file.

As illustrated in FIG. 6, the file information display section 114 may be provided with page feed buttons 118, and whenever one of the page feed buttons 118 is pressed, different items of attribute information of the document file may be sequentially displayed in the file information display section 114. In addition, as illustrated in FIG. 6, the preview display section 116 may be provided with page feed buttons 120, and whenever one of the page feed buttons 120 is pressed, different pages of the document file may be sequentially displayed. Although both the file information display section 114 and the preview display section 116 are provided in the present exemplary embodiment, only one of the file information display section 114 and the preview display section 116 may be provided.

Batch Selection in Units of Documents

Next, processing in the case where the batch selection part 78 in units of documents (see FIG. 7) is pressed will be described. By pressing the batch selection part 78 in units of documents with a mouse cursor or the like, the user collectively selects a plurality of documents corresponding to the pressed batch selection part 78 in units of documents, as surrounded and indicated by a rounded rectangle illustrated in FIG. 7. In response to the user's pressing of the batch selection part 78 in units of documents, the list screen providing unit 26 displays a pop-up window 90, as illustrated in FIG. 7.

The pop-up window 90 includes a batch download (batch reading) button 92 and a batch upload (batch registration)

button 94. By pressing the batch download button 92 with a mouse cursor or the like, the user allows, among the documents selected by the batch selection part 78 in units of documents, one or more registered document files (one or more registered document files in the document DB 32) to be read to the client 14.

In contrast, by pressing the batch upload button 94 on the pop-up window 90 with a mouse cursor or the like, the user allows the registration screen 100A illustrated in FIG. 9 to be displayed on the display of the client 14. For convenience of illustration, FIG. 9 illustrates the allocation table 104A regarding the top three documents among five documents selected by the batch selection part 78 in units of documents in FIG. 7. Hereinafter, the registration screen 100A illustrated in FIG. 9 will also be referred to as the registration screen 100A corresponding to batch selection in units of documents.

Registration Screen Corresponding to Batch Selection in Units of Documents

Next, the registration screen 100A (FIG. 9) corresponding to batch selection in units of documents will be described in detail. Although the registration screen 100A illustrated in FIG. 9 is different from the registration screen 100 (FIG. 6) corresponding to batch selection in units of steps in the point that the allocation table 104A is regarding a plurality of documents across projects, the registration screen 100A is the same as the registration screen 100 (FIG. 6) in the other points. In the following description of the registration screen 100A illustrated in FIG. 9, descriptions of points that are common to those of the registration screen 100 illustrated in FIG. 6 will be omitted as appropriate.

Figure 8:
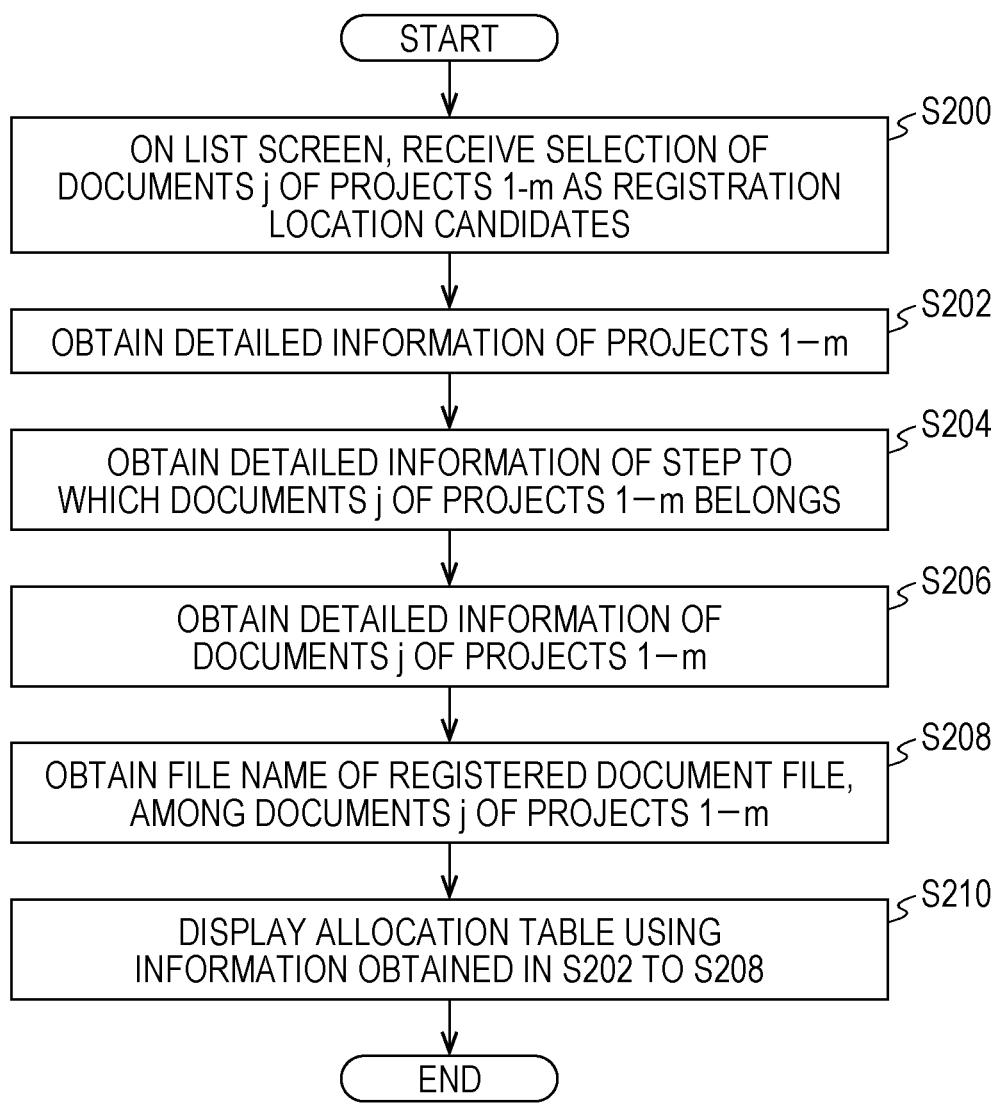
FIG. 8 is a flowchart illustrating the flow of a process of displaying an allocation screen for batch selection based on the same document.

FIG. 8 is a flowchart illustrating the flow of a process performed by the processor 20 of the file management apparatus 12 to display the allocation table 104A included in the registration screen 100A illustrated in FIG. 9.

In step S200 in FIG. 8, the processor 20 functions as the operation receiving unit 24, and receives selection of documents j of projects 1 to m as registration location candidates on the list table 62 (see FIG. 7). This is processing in the case where, in FIG. 7, the batch selection part 78 in units of documents is pressed, and the batch upload button 94 is pressed on the pop-up window 90. Here, the project 1 refers to the top project in the project information field 70 of the list table 62 (see FIG. 7); the project m refers to the m-th project from the top in the project information field 70; the document j refers to the j-th document when documents indicated in the document item 68 of the list table 62 are sequentially numbered from the left; and the documents j of the projects 1 to m refer to m documents (registration location candidates).

Next, in step S202, the processor 20 functions as the registration screen providing unit 28, and obtains detailed information of each of the projects 1 to m from the project information 40 in the document DB 32. The obtained detailed information is displayed in the project information field 106 of the allocation table 104A (see FIG. 9). As illustrated in FIG. 9, items of detailed information of the projects are vertically arranged and displayed in the project information field 106. Note that the flow illustrated in FIG. 8 is, like the flow illustrated in FIG. 5, a mode in which, after obtaining information in each of steps S202 to S208, in step S210, the registration screen providing unit 28 generates the allocation table 104A using the obtained items of information, and displays the allocation table 104A.

Next, in step S204, the registration screen providing unit 28 obtains detailed information of a step to which each of the documents j of the projects 1 to m belongs from the project step information 42 in the document DB 32. The obtained detailed information is displayed in the step information field 108 of the allocation table 104A. Note that the step detailed information is displayed in the step information field 108 in association with each project in the project information field 106.

Next, in step S206, the registration screen providing unit 28 obtains detailed information of each of the documents j of the projects 1 to m from the project document information 44 in the document DB 32. The obtained detailed information is displayed in the document information field 110 of the allocation table 104A. Note that the detailed information of each document is displayed in the document information field 110 in association with each project in the project information field 106.

Next, in step S208, the registration screen providing unit 28 obtains the file name of a document file registered to the document DB 32, among the documents j of the projects 1 to m, from the registered document file association information 46 in the document DB 32. The obtained file name is displayed in the allocation field 112 of the allocation table 104A. In the allocation field 112, the file name of a registered document file is displayed in association with each document in the document information field 110. In FIG. 9, "basic contract_k1.doc" is a registered document file.

Next, in step S210 in FIG. 8, the registration screen providing unit 28 generates the allocation table 104A using the registration screen definition information 36 (see FIG. 2) and the items of information obtained in steps S202 to S208, and presents the allocation table 104A to the display of the client 14. So far is the description of the flow illustrated in FIG. 8.

In the allocation table 104A illustrated in FIG. 9, the point that the user allocates a document file stored in the client 14 to the allocation field 112 of a document (registration location candidate) where the user desires to register the document file by, for example, drag-and-drop is the same as the allocation table 104 illustrated in FIG. 6. In FIG. 9, "contract_k3.doc" is an allocated document file.

Here, like the allocation screen 102 illustrated in FIG. 6, detailed information of a document (registration location candidate) that is not displayed on the list screen 60 is displayed on an allocation screen 102A illustrated in FIG. 9. In FIG. 9, "plan manager" and "planned date" in the step information field 108 and "creation manager" and "scheduled creation date" of each document in the document information field 110 are detailed information. Also on the allocation screen 102A illustrated in FIG. 9, while checking each item of detailed information displayed in the allocation table 104A, the user is able to allocate a document file to the allocation field 112 of each registration location candidate in the allocation table 104A. Accordingly, allocation of a document file to a wrong registration location candidate is suppressed. When the user presses the upload button 122 on the registration screen 100A illustrated in FIG. 9 with a mouse cursor or the like, each document file allocated to the allocation field 112 is registered to the document DB 32.

The following points are the same as the registration screen 100 illustrated in FIG. 6: in response to the user's allocation of document files to the allocation field 112, each temporary document file 56 and the temporary document file association information 50 are stored in the temporary storage area 38 (see FIG. 2); in response to pressing of the upload button 122 on the registration screen 100A, each temporary document file 56 and the temporary document file association information 50 stored in the temporary storage area 38 are moved to the document DB 32; and in response to the user's pressing of an allocated document file 130 or a registered document file 132 on the registration screen 100A with a mouse cursor or the like, the attribute information of the document file is displayed in the file information display section 114, and the preview screen of the document file is displayed in the preview display section 116.

Next, the movement, duplication, and replacement of a document file in the allocation field 112 of the allocation table will be described. Note that the mode described here is applicable to both the allocation tables 104 and 104A illustrated in FIGS. 6 and 9, respectively.

FIG. 10 illustrates how the registered document file 132 arranged in the allocation field 112 of the allocation table 104A is duplicated to the allocation field 112 of another registration location. As illustrated in FIG. 10, a confirm window 140 is displayed by dragging and dropping the registered document file 132, and the registered document file 132 is duplicated to the allocation field 112 of the drop destination by pressing a duplicate button 142 within the confirm window 140. In this case, a file name is displayed as an allocated document file in the allocation field 112 of the drop destination. As described above, on the allocation screen 102A, the user may permit duplication of a registered document file that is already registered to a registration location to a registration location where no document file is registered (registration location candidate). In doing so, the task of allocating a document file to the allocation field 112 becomes more efficient, compared to the case where the registered document file 132 is read to the client 14 once and then is allocated to the allocation field 112 of the allocation table 104A.

In contrast, it is preferable not to permit the movement of the registered document file 132 arranged in the allocation field 112 of the allocation table 104A to the allocation field 112 of a registration location where no document file is registered (registration location candidate) by drag-and-drop or the like. In doing so, the registered document file 132 may be prevented from being carelessly lost from the registration location. In the present exemplary embodiment, it is not permitted to replace the allocated document file 130 arranged in the allocation field 112 of a certain registration location with the registered document file 132 arranged in the allocation field 112 of another registration location.

It may be permitted to move and duplicate the allocated document file 130 (referred to as the original document file) arranged in the allocation field 112 of the allocation table 104A to the allocation field 112 of another registration location candidate by drag-and-drop or the like, and to replace the allocated document file arranged in the allocation field 112 of another registration location candidate with the original document file. In doing so, the task of allocating a document file to the allocation field 112 becomes more efficient, compared to the case where a document file stored in the client 14 is sent from the client 14 to the file management apparatus 12 by allocating the document file to the allocation field 112.

As is clear from the above, on the allocation table 104A, besides the case where a plurality of different document files are allocated to a plurality of registration location candidates, the same document file may be allocated to a plurality of registration location candidates.

Other Exemplary Embodiments

Next, other exemplary embodiments will be described. Although the list table 62 (see FIG. 3) includes the batch selection part 76 in units of steps and the batch selection part 78 in units of documents in the above-described exemplary embodiment, the list table 62 may include a batch selection part for collectively selecting a plurality of documents in units of predetermined document classifications. A document classification means the type of document, such as a contract, a design document, and a specification. "Collectively selecting a plurality of documents in units of document classifications" means, for example, collectively selecting documents with the name "design document". Accordingly, the user is able to collectively select documents of the same classification (such as documents with the name "design document") and register these document files together on the registration screen.

In the above-described exemplary embodiment, document files are stored to a database. However, the mode may be such that document files are registered (stored) to folders as registration locations. For example, the processor 20 of the file management apparatus 12 displays many folders, and provides a selection screen that receives, from a user, selection of a plurality of folders as registration location candidates from among these many folders, displays the plurality of folders (registration location candidates) selected on the selection screen, and provides an allocation screen on which the user allocates a document file to each of the plurality of folders (registration location candidates). At this time, the processor 20 displays detailed information of the folders as registration location candidates on the allocation screen, which is not displayed on the selection screen. Detailed information of a folder includes, for example, the attribute information of the folder (creation date and time, update date and time, and size), the number of files stored in the folder, and the type of each file. In doing so, registration (storage) of a document file to a wrong folder is suppressed.

In the above-described exemplary embodiment, the file management apparatus 12 allows the list screen and the registration screen to be displayed on the display of the client 14. However, the file management apparatus 12 may allow the list screen and the registration screen to be displayed on the display of the file management apparatus 12, and the user may perform operations on these screens using an input device (a mouse, a keyboard, etc.) of the file management apparatus 12.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A file management apparatus comprising:
a processor and memory storing instructions, the instructions being executed by the processor to
perform control to display
a selection screen on which a user selects, from a plurality of registration location candidates for one or more electronic files, a subset that includes more than one of the plurality of registration location candidates, and
an allocation screen (i) that displays the selected subset of registration location candidates while not displaying others of the plurality of registration location candidates not selected by the user from the selection screen, and (ii) from which the user allocates an electronic file to each registration location candidate of the subset, and
perform control to display,
on the selection screen, a selection part for the user to collectively select the plurality of registration location candidates of the subset based on a predetermined document classification of the plurality of registration location candidates,
on the allocation screen, detailed information of each registration location candidate of the selected subset, the information not being displayed on the selection screen, and
in response to selection by the user of an electronic file allocated to a registration location candidate on the allocation screen, at least one of attribute information and a preview screen of the selected electronic file simultaneously with the allocation screen.

2. The file management apparatus according to claim 1, wherein the instructions are executed by the processor for the user to perform, on the allocation screen, at least one of movement and duplication of an electronic file allocated to a registration location candidate to another registration location candidate, and replacement of an electronic file allocated to a registration location candidate with an electronic file allocated to another registration location candidate.

3. The file management apparatus according to claim 2, wherein the instructions are executed by the processor to prevent, while displaying on the allocation screen a registered electronic file that is already registered to a registration location, the user from moving the registered electronic file to a registration location candidate.

4. The file management apparatus according to claim 2, wherein the instructions are executed by the processor for the user to, on the allocation screen, duplicate a registered document file that is already registered to a registration location to a registration location candidate.

5. The file management apparatus according to claim 1, wherein the instructions are executed by the processor to prevent, while displaying on the allocation screen a registered electronic file that is already registered to a registration location, the user from moving the registered electronic file to a registration location candidate.

6. The file management apparatus according to claim 5, wherein the instructions are executed by the processor for the user to, on the allocation screen, duplicate a registered document file that is already registered to a registration location to a registration location candidate.

7. The file management apparatus according to claim 1, wherein the instructions are executed by the processor for the user to, on the allocation screen, duplicate a registered document file that is already registered to a registration location to a registration location candidate.

8. The file management apparatus according to claim 1, wherein:
a registration location among the registration location candidates (i) is for an electronic file, which is scheduled to be created in each step of a project including a plurality of steps, and (ii) is defined by a type of the electronic file, and
the instructions are executed by the processor to perform control to display, on the selection screen, another selection part for the user to collectively select a plurality of registration location candidates associated with each step of the plurality of steps of the project.

9. The file management apparatus according to claim 1, wherein each registration location candidate of the selected subset is identified simultaneously on the selection screen by indicia that identifies the registration location candidate as having been selected.

10. A non-transitory computer readable medium storing a program causing a computer to execute a process, the process comprising:
performing control to display
a selection screen on which a user selects, from a plurality of registration location candidates for one or more electronic files, a subset that includes more than one of the plurality of registration location candidates, and
an allocation screen (i) that displays the selected subset of registration location candidates while not displaying others of the plurality of registration location candidates not selected by the user from the selection screen, and (ii) from which the user allocates an electronic file to each registration location candidate of the subset; and
performing control to display,
on the selection screen, a selection part for the user to collectively select the plurality of registration location candidates of the subset based on a predetermined document classification of the plurality of registration location candidates,
on the allocation screen, detailed information of each registration location candidate of the selected subset, the information not being displayed on the selection screen, and
in response to selection by the user of an electronic file allocated to a registration location candidate on the allocation screen, at least one of attribute information and a preview screen of the selected electronic file simultaneously with the allocation screen.

11. A file management apparatus comprising:
a processor and memory storing instructions, the instructions being executed by the processor to
perform control to display
a selection screen on which a user selects, from a plurality of registration location candidates for one or more electronic files, a subset that includes more than one of the plurality of registration location candidates, and
an allocation screen (i) that displays the selected subset of registration location candidates while not displaying others of the plurality of registration location candidates not selected by the user from the selection screen and (ii) from which the user allocates an electronic file to each registration location candidate of the subset, and perform control to display, on the allocation screen,
- on the selection screen, a selection part for the user to collectively select the plurality of registration location candidates of the subset based on a predetermined document classification of the plurality of registration location candidates,
- on the allocation screen, detailed information of each registration location candidate of the selected subset, the information not being displayed on the selection screen, and
- in a case where the user allocates a first electronic file to an empty registration location candidate of the selected subset, (i) the first electronic file allocated to the empty registration location candidate and (ii) a second electronic file that is already stored in another registration location candidate of the selected subset in a different form on the allocation screen.

* * * * *